(12) United States Patent
Jean et al.

(10) Patent No.: US 10,830,659 B2
(45) Date of Patent: Nov. 10, 2020

(54) METHOD OF CONTROLLING A POSITIVE-IGNITION INTERNAL COMBUSTION ENGINE BY MEANS OF A KNOCK ESTIMATOR

(71) Applicant: IFP Energies nouvelles, Rueil-Malmaison (FR)

(72) Inventors: Maxime Jean, Antony (FR); Thomas Leroy, Saint Germain en Laye (FR); Fabien Vidal-Naquet, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 56 days.

(21) Appl. No.: 16/211,796

(22) Filed: Dec. 6, 2018

(65) Prior Publication Data
US 2019/0219471 A1 Jul. 18, 2019

(30) Foreign Application Priority Data
Dec. 6, 2017 (FR) ...................................... 17 61708

(51) Int. Cl.
| | |
|---|---|
| *G01L 23/22* | (2006.01) |
| *F02D 35/02* | (2006.01) |
| *F02P 5/152* | (2006.01) |
| *F02P 17/12* | (2006.01) |
| *F02D 41/14* | (2006.01) |

(52) U.S. Cl.
CPC .......... *G01L 23/227* (2013.01); *F02D 35/023* (2013.01); *F02D 35/027* (2013.01); *F02P 5/1523* (2013.01); *F02D 41/1473* (2013.01); *F02D 2041/1423* (2013.01); *F02D 2041/1433* (2013.01); *F02P 2017/128* (2013.01)

(58) Field of Classification Search
CPC ..... G01L 23/227; G01L 23/22; G01L 23/221; G01L 23/225; F02D 35/023; F02D 35/027; F02D 2041/1433; F02D 2041/1423; F02D 41/1473; F02P 5/1523; F02P 2017/128
See application file for complete search history.

(56) References Cited

U.S. PATENT DOCUMENTS

| | | | | |
|---|---|---|---|---|
| 4,711,212 A | * | 12/1987 | Haraguchi | ............... F02P 5/152 |
| | | | | 123/406.38 |
| 4,819,599 A | * | 4/1989 | Chemnitzer | .......... F02P 5/1521 |
| | | | | 123/406.36 |

(Continued)

FOREIGN PATENT DOCUMENTS

| | | | | |
|---|---|---|---|---|
| CN | 1683781 A | * | 10/2005 | ........... F02D 35/027 |
| CN | 1683912 A | * | 10/2005 | ........... G01L 23/225 |

(Continued)

*Primary Examiner* — Hung Q Nguyen
*Assistant Examiner* — Susan E Scharpf
(74) *Attorney, Agent, or Firm* — Fitch, Even, Tabin & Flannery LLP (57) ABSTRACT

The present invention relates to a method of controlling a positive-ignition internal combustion engine, in which the ignition advance is controlled (CON) by means of an estimation (EST) of the distribution of the knock measurements (MEAS). This estimation (EST) makes it possible to determine, for these measurements (MEAS), a confidence interval ($q_{min}$, $q_{max}$) of a predetermined quantile of the distribution of the knock measurements (MEAS).

21 Claims, 4 Drawing Sheets

(56) References Cited

U.S. PATENT DOCUMENTS

| | | | | |
|---|---|---|---|---|
| 5,190,011 | A * | 3/1993 | Hashimoto | F02P 5/1525 123/406.38 |
| 6,145,491 | A * | 11/2000 | Wilstermann | F02P 5/152 123/406.35 |
| 7,054,735 | B2 * | 5/2006 | Masuda | F02D 35/027 701/111 |
| 2005/0234632 | A1 * | 10/2005 | Masuda | G01L 23/225 701/111 |
| 2006/0288982 | A1 * | 12/2006 | Kaneko | F02D 35/027 123/406.39 |
| 2007/0016387 | A1 * | 1/2007 | Takemura | G01L 23/225 702/185 |
| 2007/0067091 | A1 * | 3/2007 | Takemura | F02D 35/027 701/111 |
| 2007/0215108 | A1 * | 9/2007 | Kaneko | F02P 5/152 123/406.34 |
| 2007/0215109 | A1 * | 9/2007 | Kaneko | F02D 35/027 123/406.34 |
| 2008/0294328 | A1 * | 11/2008 | Kaneko | G01L 23/225 701/111 |

FOREIGN PATENT DOCUMENTS

| | | |
|---|---|---|
| FR | 2 949 511 A1 | 3/2011 |
| WO | 2007/032244 A1 | 3/2007 |
| WO | 2008/044622 A1 | 4/2008 |

\* cited by examiner

METHOD OF CONTROLLING A POSITIVE-IGNITION INTERNAL COMBUSTION ENGINE BY MEANS OF A KNOCK ESTIMATOR

CROSS REFERENCE TO RELATED APPLICATIONS

Reference is made to French Patent Application No. 17/61.708 filed Dec. 6, 2017, which is incorporated herein by reference in its entirety.

BACKGROUND OF THE INVENTION

Field of the Invention

The present invention relates to control of combustion of a positive-ignition internal combustion engine, to reduce the phenomenon of engine knock.

Description of the Prior Art

Positive internal combustion engines comprise at least one cylinder including a combustion chamber delimited by an inner side wall of the cylinder, by a crown of the piston that slides in this cylinder and by a cylinder head. Generally, a carburetted mixture is contained in the combustion chamber and undergoes a compression stage, then a combustion stage triggered by a positive ignition by a spark plug. These stages are described under the terminology "combustion phase" in the description hereinafter.

In a spark-ignition engine, combustion of the air/gasoline mixture normally begins after the spark. The flame front propagates and its blast pushes a part of the mixture against the walls of the cylinder and the piston crown. The increase in pressure and temperature is sometimes sufficiently great for the unburned mixture trapped against the walls to reach its auto-ignition point and ignite spontaneously in one or more locations. This phenomenon is called "knock". Thus knock is above all a phenomenon of abnormal combustion in positive-ignition engines, which can be perceived externally by a metallic noise coming from the engine that results from the development of pressure waves in the combustion chamber.

These parasitic explosions produce vibrations in the acoustic domain and beyond of the order of 5 to 50 Khz. They are very intense and can quickly lead to localized overheating. The build-up of knock damages the metal of at least one of the piston, the walls of the cylinder and the piston rings. After some time (according to the intensity) this leads to the destruction of the piston, the piston rings or the walls of the cylinder.

Estimating the knock allows control of the combustion, limiting the effect of the knock and avoiding damage to the cylinder.

Methods are known for estimating the knock of an internal combustion engine. These are conventionally based on recording signals originating from a cylinder pressure sensor or an accelerometer. A first method applies a Fourier transform technique to these, that is in subsequent processing, in order to estimate the knock. Such a method is described in the following documents:

"Application of the Reallocated Smoothed Pseudo Wigner-Ville Distribution to Knock Detection", Olivier BOUBAL and Jacques OKSMAN, Traitement du Signal volume 15, 1998.

"Knock Measurement for Fuel Evaluation in Spark Ignition Engines", C. Hudson, X Gao, R. Stone, Fuel volume 80 (2001).

A second method applies a filtering technique to the signals detects maxima in order to estimate the knock offline. Such a method is described in the following document:

"Modeling of In-cylinder Pressure Oscillations Under Knocking Conditions: Introduction to Pressure Envelope Curve", G. Brecq and O. Le Corre, S A E 2005.

Another method is also known, which is based on recording signals originating from a cylinder pressure sensor. A wavelet technique is applied to the signals in order to estimate the knock offline. Such a method is described in the following document:

"Knocking Detection Using Wavelet Instantaneous Correlation Method", Z. Zhang and E. Tomita, Journal of SAE Review volume 23 (2002).

However, these methods do not allow estimation of the knock intensity in real time typically, the calculation must be carried out in less than 50 µs in order to be loaded on a computer.

A method is known from patent application FR 2 949 511 for estimating the knock intensity in real time, based on a vibratory signal. According to this method, the coefficients of the Fourier decomposition of this signal are determined in real time, and the energy contained in the signal is deduced by summing the squares of these coefficients of the Fourier decomposition. Finally, the knock intensity is estimated by determining a parameter correlated with the knock intensity equal to the square root of the energy maximum.

It has also been considered to use other sensors, such as for example an ionization probe.

With respect to the knock measurement, generally a scalar number is obtained that reflects the intensity of the phenomenon that took place during one cycle. The indicator, of whatever type, is called a knock indicator (KI). The variability of the successive KI measurements, independently of any measurement noise, is significant with respect to the variations in their average over time on timescales characteristic of the state of engine evolution. The distribution of the KI measurements (not of the measurements considered individually) contains the data giving information on the tendency of the engine to experience knock cycles. It may be considered to use the average of the KI values. However, the characterization of this distribution by its average alone is insufficient to forecast the occurrence of high KI, capable of damaging the engine. In fact, experience has shown that the dispersion of the measurements is not linked to their average. A controller correctly controlling the average KI on a target does not control the probability of occurrence of the high distribution values, which does not allow reliable control of knock.

SUMMARY OF THE INVENTION

In order to overcome these drawbacks, the present invention relates to a method of controlling a positive-ignition internal combustion engine, in which the ignition advance is controlled by an estimation of the distribution of the KI knock measurements. This estimation makes it possible to determine, for these measurements, a confidence interval of a predetermined quantile of the KI distribution. Thus, it is possible to control the internal combustion engine in real time to assure a given proportion of cycles considered to be at risk, while having a limited number of measurements. In addition, the estimation, which preferably is Bayesian, allows simple calculations (simple scalar operations) to be carried out, requiring short calculation time, small amount of memory, and fewer hardware resources.

The method according to the invention maximizes the average energy efficiency of the engine by fine control of the level of knock.

The invention relates to a method of controlling a positive-ignition internal combustion engine, comprising a knock sensor arranged on the internal combustion engine. The method includes the following:
a) carrying out N knock measurements by use of the knock sensor;
b) constructing an estimator of a distribution of the N knock measurements, the estimator determining a confidence interval of a predetermined quantile by use of the N knock measurements;
c) controlling the ignition within the internal combustion engine as a function of a comparison with the confidence interval:
  i) if the knock threshold is less than the minimum value of the confidence interval of the predetermined quantile, decreasing the ignition advance;
  ii) if the knock threshold is greater than the maximum value of the confidence interval of the predetermined quantile, increasing the ignition advance; and
  iii) if the knock threshold is within the confidence interval, nor change to the ignition advance is made.

According to an embodiment, the estimator is a Bayesian estimator.

According to an embodiment, the distribution is a distribution that can be related to a normal distribution by a mathematical method, preferably the distribution is a log-normal distribution.

According to an aspect, the estimator also determines the expected value q for the predetermined quantile.

Advantageously, the ignition advance is decreased or increased proportionally to the difference between the expected value for the predetermined quantile and the knock threshold.

According to an implementation, N is between 5 and 20, and preferably is between 7 and 15.

According to an embodiment, the confidence interval contains the value of the real quantile in exactly 98% of cases.

Advantageously, the knock sensor is an accelerometer arranged on the cylinder head of the internal combustion engine.

Preferably, the knock measurement is the maximum amplitude of the filtered signal of the accelerometer.

According to an embodiment of the invention, the knock threshold is obtained by engine bench tests during the phase of calibration of the engine.

According to an aspect, the predetermined quantile of the distribution is greater than or equal to 80%.

In addition, the invention relates to a control system for a positive-ignition internal combustion engine comprising implementing the method according to one of the aforementioned characteristics.

The invention also relates to a computer program product that can be downloaded from a communication network and at least one of recorded on a tangible computer-readable medium and executed by a processor, comprising program code instructions for implementing the method according to one of the aforementioned characteristics, when the program is executed on a computer.

BRIEF DESCRIPTION OF THE DRAWINGS

Other characteristics and advantages of the method according to the invention will become apparent on examination of the description below of embodiments that are in no way limitative, and with reference to the attached drawings described below.

DETAILED DESCRIPTION ON THE INVENTION

The method according to the invention relates to a method of controlling the combustion of an internal combustion engine, taking account of the engine knock phenomena. The method includes comparison of values obtained by an estimator (expected value for a predetermined quantile and confidence interval) to a knock threshold. The stochastic values are determined based on processing of a signal originating from a knock sensor with the signal having a physical sense, in order to directly classify the combustion and the possible appearance of knock. The method is independent of the nature of a combustion, the technology of the sensor being used and the KI indicator.

This type of engine comprises at least one cylinder including a combustion chamber delimited by the inner side wall of the cylinder, a crown of a piston that slides in each cylinder and by the cylinder head. Generally, a carburetted mixture is enclosed in this combustion chamber and undergoes a compression stage, then a combustion stage, under the effect of a positive ignition, at least by a spark plug.

The knock sensor used for the control method according to the invention can be of any type, for example an accelerometer or a pressure sensor.

According to an embodiment of the invention, the knock sensor is an accelerometer located on the cylinder head of the internal combustion engine.

The method according to the invention includes the following stages:
1) Knock measurements
2) Construction of an estimator
3) Comparison with a threshold
4) Control of the ignition within the internal combustion engine.

Figure 1:
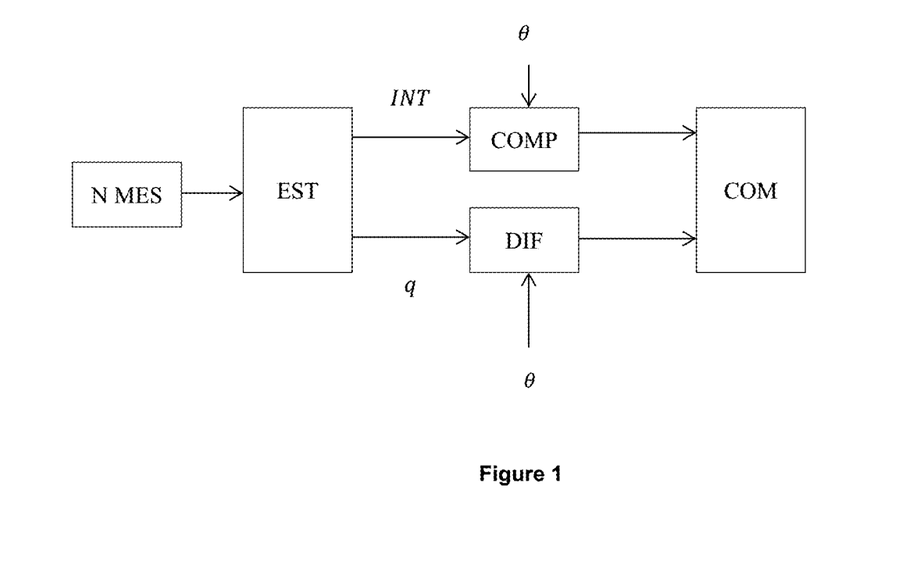
FIG. 1 shows the method according to an embodiment of the invention.

FIG. 1 shows, diagrammatically and non-limitatively, stages of the method according to an embodiment of the invention. The method includes carrying out N measurements (N MEAS) by use of the knock sensor, constructing of an estimator (EST) that (optionally) determines an expected value q and a confidence interval INT of a predetermined quantile, comparison (COMP) with a threshold value $\theta$ and a stage of control (CON) in real time. Optionally, and as shown in FIG. 1, the method can also include determining the difference (DIF) between the expected value q for the predetermined quantile and the threshold value θ, with this difference being taken into account for the control stage (CON).

The different stages of the method according to the invention will be described below with reference to FIG. 1.

1) Knock Measurements (N MEAS)

In this stage, N knock measurements are carried out by use of the knock sensor. Each measurement is a measurement carried out for one combustion cycle. These measurements can be recorded in an internal memory. As a result, for each cycle, the measurements are known for the N cycles preceding the current cycle.

For the embodiment of the invention for which the knock sensor is an accelerometer, the measurement can be the maximum amplitude of the filtered signal of the accelerometer. This value reflects the knock intensity (KI).

According to an embodiment of the invention, the number N is greater than or equal to 5, preferably between 5 and 20, and preferably between 7 and 15. In fact, at least 5 values make it possible to construct a representative estimator. In addition, the limit of 20 measurements makes it possible to form a reactive estimator which allows the random-access memory used for the method according to the invention to be limited. However, for an application that does not need a reactive estimator, the largest possible number N may be taken.

2) Construction of an Estimator (EST)

This is the construction of an estimator that determines a confidence interval INT around the expected value for a quantile predetermined by use of the N measurements taken in the preceding stage. Estimating the confidence interval makes it possible to obtain a robust control. Moreover, the estimator can also determine the predetermined expected value for the quantile.

For this stage, it is considered that the measurements follow a stochastic distribution law. Preferably, the stochastic law is a distribution that can be related to a normal distribution by a mathematical method, preferably the distribution is a log-normal distribution.

For this construction, it is considered that the knock measurements follow a log-normal distribution. This is a standard hypothesis in the literature. Such a consideration is described in the following document: "Spelina, J. M.; Peyton Jones, J. C. & Frey, J. Characterization of Knock Intensity Distributions: Part 2: Parametric Models Proceedings of the Institution of Mechanical Engineers, Part D: Journal of Automobile Engineering, Sage Publications Sage UK: London, England, 2013, 227, 1650-1660".

In fact, this distribution is particularly suitable, as knock is an exponential phenomenon, for which the distribution corresponds substantially to a normal distribution on a logarithmic scale. Such a distribution is determined by the following two parameters: the average and the standard deviation. With these values, it is possible to calculate any quantile of this distribution.

According to an aspect of the invention, the predetermined quantile corresponds to at least 80%. This high quantile is a good indicator of the knock status, with harmful cycles corresponding to the high KI values. Preferably, the predetermined quantile can be 80%, 95%, 99% or 99.7%.

Such an estimation can be carried out quickly with a limited number of measurements, which allows real-time control, with a limited memory requirement. In addition, this estimator contributes stability to the method according to the invention, regardless of the number of measurements.

According to an embodiment of the invention, the estimator is a Bayesian estimator. This estimator makes it possible to determine the confidence interval for the estimation of the quantile reactively with a limited number of measurements.

According to an embodiment of the invention, the confidence interval contains the value of the real quantile in exactly 98% of cases. In other words, the value of the real quantile is less than the confidence interval in 1% of cases and greater than the confidence interval in 1% of cases.

An example of Bayesian estimation of a confidence interval is given non-limitatively in an annex to the present application (at the end of the description).

3) Comparison with a Threshold (COMP)

During this stage, the expected value and the confidence interval determined in the preceding stage are compared with a knock threshold. In other words, it is verified whether the knock threshold is within the confidence interval.

The knock threshold can be obtained by engine bench tests during the phase of calibration of the engine.

FIGS. 2 to 5 show this stage diagrammatically and non-limitatively.

Figure 2:
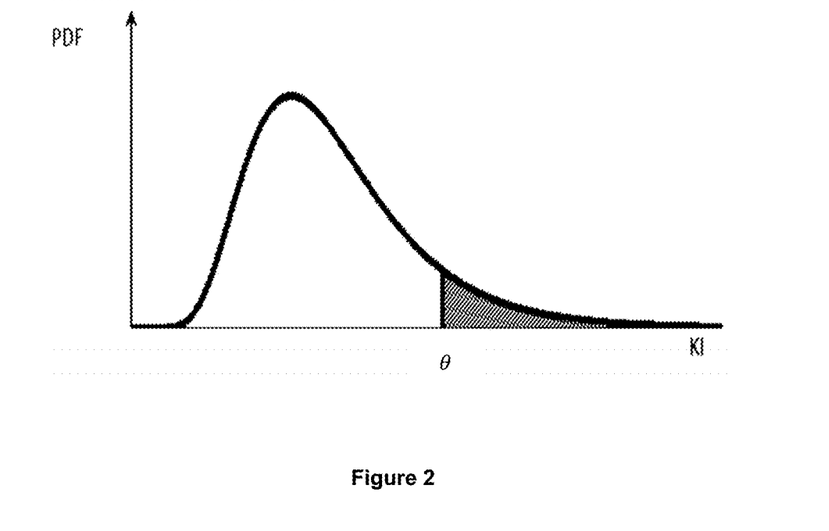
FIG. 2 shows a distribution of the knock measurements.

FIG. 2 shows a probability density for the KI signal intensity of the knock sensor. This is a log-normal distribution type. The knock threshold θ is also shown in this figure. The shaded zone represents the zone for which knock is present.

Figure 3:
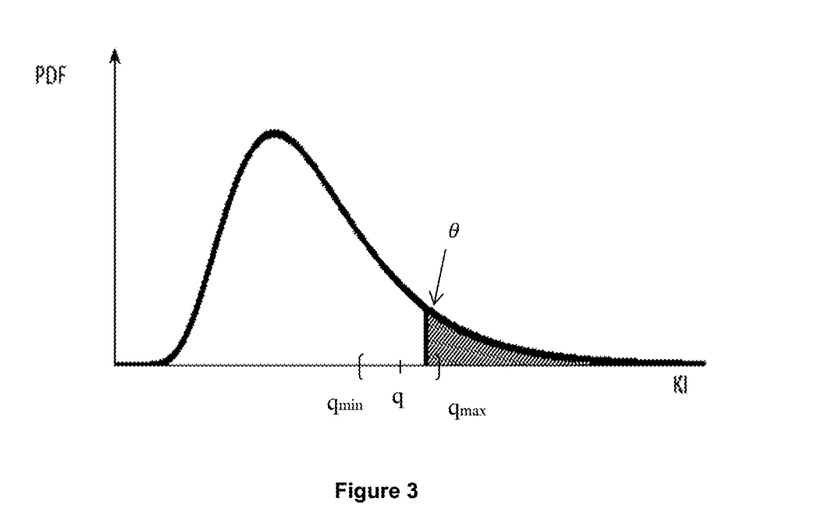
FIGS. 3 to 5 show the comparison stage according to three example cases which are the threshold is within the confidence interval, the threshold is greater than the confidence interval, and the threshold is less than the confidence interval.

FIG. 3 shows the probability density of FIG. 2, in which the expected value q is represented, and the confidence interval is delimited by the minimum value $q_{min}$ and maximum value $q_{max}$ thereof. The expected value and the confidence interval are obtained for the predetermined quantile (for example 95%) by use of the N measurements. For this example, the knock threshold θ is within the confidence interval determined by the Bayesian estimator. This configuration represents 1% of the example cases.

Figure 4:
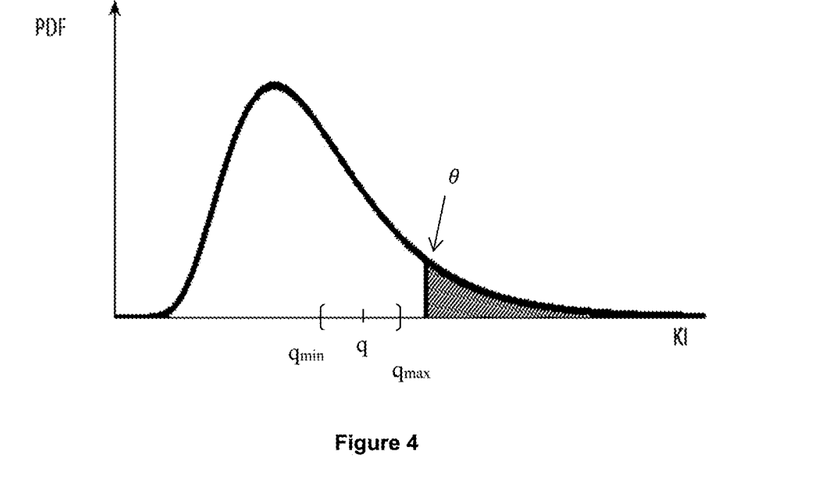

FIG. 4 shows the probability density of FIG. 2, on which are represented the expected value q, and the confidence interval, delimited by the minimum value $q_{min}$ and maximum value $q_{max}$ thereof. The expected value and the confidence interval are obtained for the predetermined quantile (for example 95%) by means of the N measurements. For this example, the knock threshold θ is greater than the confidence interval determined by the Bayesian estimator. This configuration represents 98% of the example cases.

Figure 5:
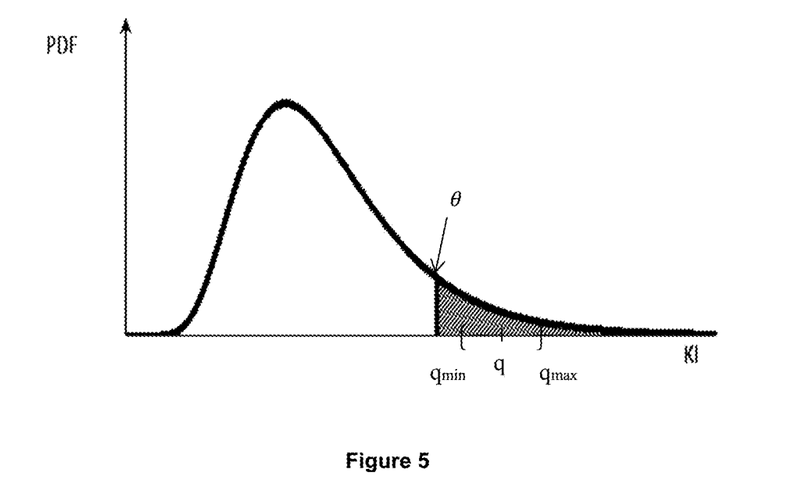

FIG. 5 shows the probability density of FIG. 2, on which are represented the expected value q, and the confidence interval, delimited by the minimum value $q_{min}$ and maximum value $q_{max}$ thereof. The expected value and the confidence interval are obtained for the predetermined quantile (for example 95%) by use of the N measurements. For this example, the knock threshold θ is less than the confidence interval determined by the Bayesian estimator. This configuration represents 1% of the example cases.

3') Difference (DIF)

This is an optional stage of the method according to the invention.

During this stage, the difference between expected value q of the predetermined quantile determined in the preceding stage and the knock threshold θ is determined.

Determining this difference allows taking into account the control which is adapted to the knock intensity.

4) Ignition Control within the Engine (CON)

During this stage, the ignition advance in the cylinders of the internal combustion engine is controlled as a function of the knock, by taking into account of the comparison carried out in stage 3). According to the invention, the ignition advance of the following cycle is controlled. In other words, the ignition advance of the cycle n is controlled with the measurements from the N cycles preceding the cycle n (i.e. the cycles n-N, n-N+1, . . . , n−2, n−1).

It is noted that the ignition advance is a controllable degree of freedom that determines, via the crank angle, the angle at which combustion is initiated. This is an instantaneous-action actuator (immediately applied to the next cycle) that reduces the tendency of the engine to knock.

The control is carried out as follows:
i) if the knock threshold is less than the minimum value of the confidence interval around the expected value of the predetermined quantile, then the ignition advance is decreased (case of FIG. 5);
ii) if the knock threshold is greater than the maximum value of the confidence interval around the expected value of the predetermined quantile, then the ignition advance is increased (case of FIG. 4); and
iii) otherwise, (if the knock threshold is within the confidence interval ($q_{min}$, $q_{max}$)), the ignition advance is not changed (case of FIG. 3), in other words, the ignition advance of the preceding cycle is maintained.

Thus, the method according to the invention allows only relevant corrective actions to be taken. The ignition control is only changed if there is certainty (for example 99%, if the confidence interval represents 98% of the realizations of the distribution) that the quantile is outside the confidence interval. As a result, the ignition advance control is more stable, as changes are only imposed on approximately one cycle in fifty in steady-state operation. Reducing the dispersion of the control and the variation in the engine status over short timescales involves in return a more stable distribution of the KI measurements, better estimation of the parameters thereof, and thus the possibility of reaching close to the knock limit, obtaining better efficiency while limiting the number of knocking cycles.

According to an embodiment of the invention, this control can also take account of the difference established in stage 3'). To this end, the increase or decrease in the ignition advance (in the situations i) and ii) described below) can be proportional to the difference between the expected value q of the predetermined quantile determined in the preceding stage and the knock threshold θ. Thus, the control is adapted to the knock intensity.

In addition, the invention relates to a control system for a positive-ignition internal combustion engine comprising implementing the method according to any one of the previously-described combinations of variants of the method.

In particular, the control system can comprise:
a knock sensor,
means (processor) for processing the signal from the knock sensor,
a memory for recording N measurements (knock signal of the N preceding combustion cycles),
calculator for constructing the Bayesian estimator and for carrying out the comparison (a control), and
means for controlling the ignition advance.

The signal processor, the memory, the calculator and the control can be incorporated into an on-board computer of a vehicle.

The invention also relates to an internal combustion engine equipped with such a control system.

The invention also relates to a computer program product that can be at least one of downloaded from a communication network, and recorded on a tangible computer-readable medium (on-board computer) and executed by a processor. This program comprises program code instructions for implementing the method as described above, when the program is executed on a computer.

COMPARATIVE EXAMPLE

The characteristics and advantages of the method according to the invention will become more clearly apparent on reading the comparative example below.

The comparative example is based on the simulation of a 1.2 L three-cylinder positive-ignition internal combustion engine with direct injection. The comparative example relates to steady-state operation of the internal combustion engine at 1750 rpm.

It is noted that knock is a stochastic phenomenon. As a result, even under identical conditions, each test is unique.

Upon obtaining knock intensities corresponding to real use conditions, the experimental distributions for the knock intensities are determined for each point of operation, using all the preceding cycles.

Within the framework of the comparative example, the method according to the invention is compared to a method according to the prior art, for which the ignition advance increases at each engine cycle by a small value, and decreases significantly if the measured knock value exceeds a predetermined threshold. Conventionally, the low value is 0.01° CA (crank angle), and the significant decrease corresponds to 3° CA (crank angle). This strategy ensures a quick reaction time for all the knock cycles, while retaining 99.7% of cycles with a knock intensity less than the threshold value.

For the method according to the invention, N=10 is used, and the quantile is predetermined at 95%.

Figure 6A:
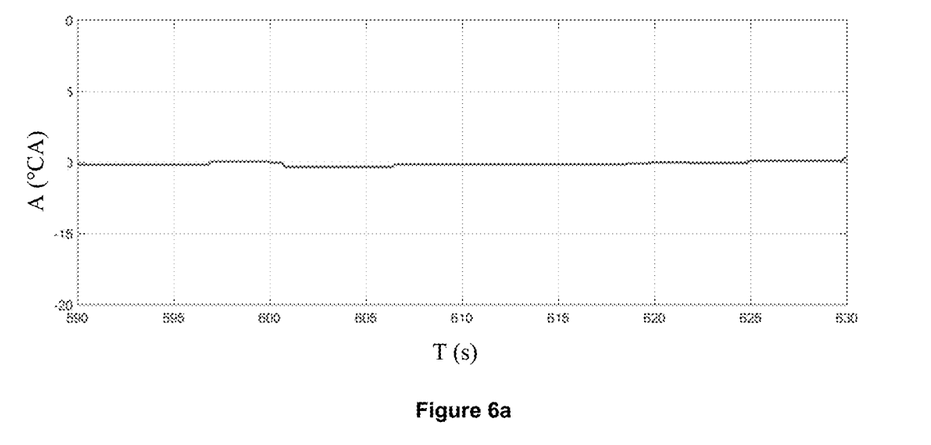
FIGS. 6a and 6b respectively represent the ignition advance and the knock measurement surrounded by the estimation of its confidence interval obtained in steady-state operation with the control method according to an embodiment of the invention.
Figure 6B:
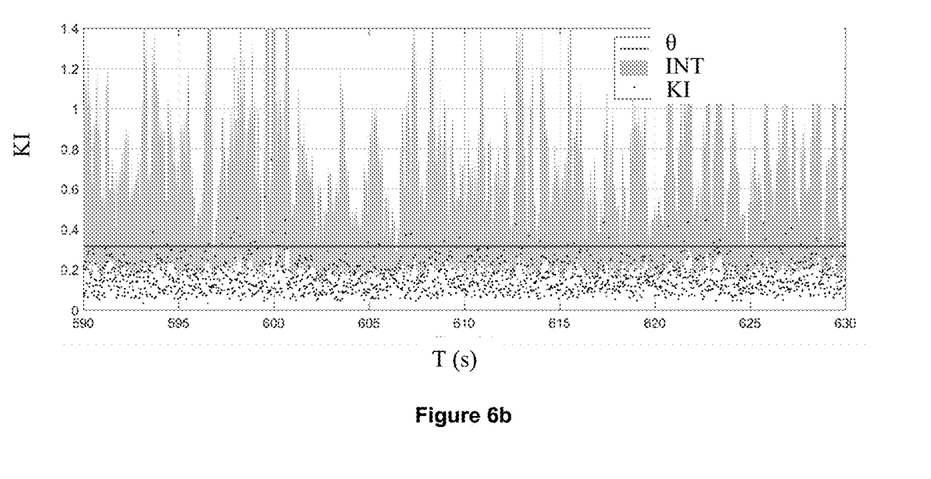

FIGS. 6*a* and 6*b* show the results obtained by the method according to the invention. FIG. 6*a* shows the ignition advance A in ° CA (crank angle) as a function of time T (s), and FIG. 6*b* shows the values for KI over the same timescale. In FIG. 6*b* the threshold θ is symbolized by a horizontal straight line, each cycle KI is represented by a dot, and the confidence interval INT associated with each dot is represented by a vertical straight-line segment. As expected, with the method according to the invention, the ignition advance is only changed when the threshold is outside the confidence interval. It is noted in FIG. 6*a* that the control is very stable (little variation in the ignition advance).

Figure 7A:
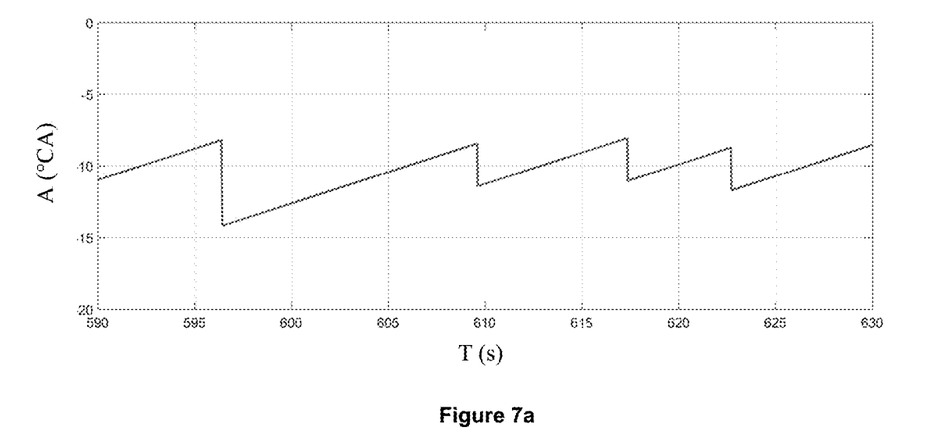
FIGS. 7a and 7b respectively represent the ignition advance and the knock measurement obtained in steady-state operation with a control method according to the prior art.
Figure 7B:
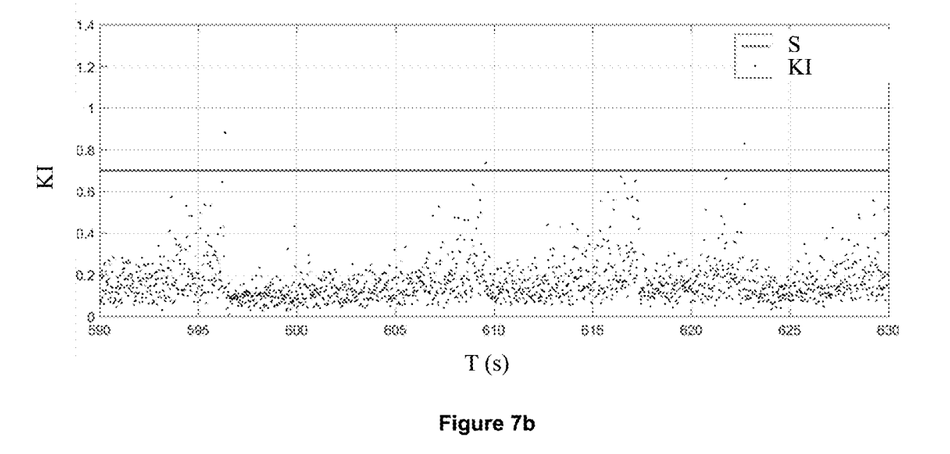

FIGS. 7*a* and 7*b* show the results obtained by the method according to the prior art. FIG. 7*a* shows the ignition advance A in ° CA (crank angle) as a function of time T (s), and FIG. 7*b* shows the values for KI over the same timescale. In FIG. 7*b* the threshold Thresh is symbolized by a horizontal straight line, each cycle KI is represented by a dot. It is noted in FIG. 7*a* that the control is not very stable, with numerous changes in the ignition advance, in particular with abrupt reductions in advance and slow returns towards the knock zone.

Then, these methods are compared in terms of fuel consumption. The result of this comparison shows that the method according to the invention allows a saving of 1.1% in consumption with respect to the method according to the prior art.

Identical tests were carried out for other steady states. For each test, the method according to the invention allows a saving in consumption with respect to the method according to the prior art, with the this saving being between 0.6 and 2.2%.

The method according to the invention thus makes it possible to limit the knock, while still reducing the consumption of the internal combustion engine.

Annex
Bayesian estimation of the confidence interval of the quantile.

In the interests of simplicity, this annex relates to the Bayesian estimation for a normal distribution. This Bayesian estimation can be adapted for any distribution capable of being related to a normal distribution, in particular a log-normal distribution.

I. Reasoning

It is assumed that n measurements are available of the physical phenomenon being studied, the random characteristics of which cannot be disregarded. It is further accepted that these measurements are independent and normally distributed. N realizations are then available, denoted $X_1, \ldots, X_n$. Let q be the true 95% quantile of this distribution. The Bayesian formula makes it possible to express the distribution of the q value, with respect to the observed measurements $X_1, \ldots, X_n$. Naturally, q can be estimated without uncertainty when n→∞. However, when n<∞ (for example n=10), q can no longer be estimated with certainty.

On the other hand, the Bayesian formalism makes it possible to define an interval that effectively frames q for 98% of the possible n-tuples of n realizations $X_1, \ldots, X_n$ originating from this same distribution.

II. Estimating the Confidence Interval of the Average

Firstly, the method is presented that determines the average μ of the distribution (and not its 95% quantile q), while assuming the known variance $\sigma^2$ of the distribution. To this end, the following Bayesian formula is introduced:

$$\pi(\mu \mid X_1, \ldots, X_n) = \frac{\overset{likelihood}{\pi(X_1, \ldots, X_n \mid \mu)} \overset{a\ priori}{\pi(\mu)}}{\underset{normalization\ factor}{\pi(X_1, \ldots, X_n)}}$$

with π the probability and | the conditioning operator.

The normalization factor does not depend on μ and acts as a constant.

The a priori law reflects a priori knowledge that is available on the distribution of μ (independently of the observations that are made subsequently). In order to avoid inserting biased information (to be considered in this context as prejudiced), the non-informative $\pi(\mu) \propto 1$ is used.

With the realizations $(X1, \ldots, X_n)$ being assumed to be conditionally independent (in the knowledge of μ), it is possible to factorize the likelihood:

$$\pi(X_1, \ldots, X_n \mid \mu) \propto \prod_{k=1}^{n} \pi(X_k \mid \mu)$$

The a posteriori formula for all the distribution factors is known. Performing the calculation gives $$\pi(\mu \mid X_1, \ldots, X_n) \propto \exp \frac{\left(\mu - \sum \frac{X_k}{n}\right)^2}{2(\sigma/\sqrt{n})^2}$$

which is simply a normal law centered on the average of the $X_k$s and standard deviation $$\frac{\sigma}{\sqrt{n}}.$$

It is then straightforward to obtain the confidence interval of μ, namely:

average±constant×standard deviation.

III. Estimation of the Confidence Interval of the Quantile.

The experimental data do not allow on the one hand the hypothesis σ=constant and on the other hand the hypothesis a is a function of μ. It is therefore necessary to carry out a parallel estimation of the pair of parameters (μ; σ). The methodology includes 3 main differences with the simple estimation of the average:

The a priori distribution of the pair (μ; σ) must be carefully selected to remain non-informative and to not generate unjustified bias during the estimation. The a priori $\pi(\mu) \propto 1$ has a very natural form. On the other hand, in the multidimensional case where not only μ but also (μ; σ) are estimated, the definition of the concept of "non-informative" (absence of prejudice) presents a higher-order difficulty. Use was made of the concepts of mutual information for maximization of the entropy of information.

The a posteriori distribution includes 4 parameters, requiring a stage of renormalization adapted to considerably reduce the calculation power necessary (avoiding all integral calculus).

The a posteriori distribution of (μ; σ) must be processed to obtain the a posteriori distribution of the 95% quantile q. The a posteriori distribution of q does not allow for a simple analytical form (without integrals) and can be carried out by separating the calculation into two stages: an expensive offline calculation of the invariants of the distribution of q and a moderate online calculation at each cycle.

The invention claimed is:

1. A control method of a positive-ignition internal combustion engine, including a knock sensor located on the internal combustion engine which measures knock and a knock threshold, comprising:
    a) carrying out N measurements of knock by use of the knock sensor;
    b) constructing an estimator of a distribution of the N measurements of knock which determines a confidence interval of a predetermined quantile from the N measurements of knock;
    c) controlling an ignition advance within the internal combustion engine as a function of a comparison with the confidence interval by:
        i) decreasing the ignition advance if the knock threshold is less than a minimum value of the confidence interval of the predetermined quantile;
        ii) increasing the ignition advance if the knock threshold is greater than a maximum value of the confidence interval of the predetermined quantile; and
        iii) making no change to the ignition advance if the knock threshold is determined to be within the confidence interval.

2. The control method according to claim 1, wherein the estimator is a Bayesian estimator.

3. The control method according to claim 1, wherein the distribution is mathematically related to a normal distribution.

4. The control method according to claim 3 wherein the distribution is a log-normal distribution.

5. The control method according to claim 1, wherein the estimator also determines an expected value of the predetermined quantile.

6. The control method according to claim 2, wherein the estimator also determines an expected value of the predetermined quantile.

7. The control method according to claim 3, wherein the estimator also determines an expected value of the predetermined quantile.

8. The control method according to claim 4, wherein the estimator also determines an expected value of the predetermined quantile.

9. The control method according to claim 5, wherein when the ignition advance is changed to either decrease or increase, the change in ignition advance is proportional to a difference between an expected value for the predetermined quantile and the knock threshold.

10. The control method according to claim 6, wherein when the ignition advance is changed to either decrease or increase, the change in ignition advance is proportional to a difference between an expected value for the predetermined quantile and the knock threshold.

11. The control method according to claim 7, wherein when the ignition advance is changed to either decrease or increase, the change in ignition advance is proportional to a difference between an expected value for the predetermined quantile and the knock threshold.

12. The control method according to claim 8, wherein the ignition advance is either decreased or increased proportionally to a difference between the expected value for the predetermined quantile and the knock threshold.

13. The control method according to claim 1, wherein N is between 5 and 20.

14. The control method in accordance with claim 13 wherein N is between 7 and 15.

15. The control method according to claim 1, wherein the confidence interval contains a value of a real quantile in 98% of cases.

16. The control method according to claim 1, wherein the knock sensor is an accelerometer located on the cylinder head of the internal combustion engine.

17. The control method according to claim 16, wherein the knock measurement is a maximum amplitude of a filtered signal provided from the accelerometer.

18. A control method according to claim 1, wherein the knock threshold is obtained from engine bench tests during calibration of the engine.

19. A control method according to claim 18, wherein the predetermined quantile of the distribution is greater than 80%.

20. A control system for a positive-ignition internal combustion engine comprising implementing the method according to claim 1.

21. A computer program product recorded on a tangible computer-readable medium and which is executed by a processor, comprising program code instructions for implementing the method according to claim 1.

* * * * *